United States Patent
Tang

(10) Patent No.: US 7,035,165 B2
(45) Date of Patent: Apr. 25, 2006

(54) IMAGING NEAR-BOREHOLE STRUCTURE USING DIRECTIONAL ACOUSTIC-WAVE MEASUREMENT

(75) Inventor: Xiao Ming Tang, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 380 days.

(21) Appl. No.: 10/353,330

(22) Filed: Jan. 29, 2003

(65) Prior Publication Data

US 2004/0158997 A1 Aug. 19, 2004

(51) Int. Cl.
*G01V 1/30* (2006.01)
*G01V 1/28* (2006.01)

(52) U.S. Cl. .............. 367/28; 367/25; 367/38
(58) Field of Classification Search ............ 367/25, 367/38, 28, 31; 33/304; 702/6, 9
See application file for complete search history.

(56) References Cited

U.S. PATENT DOCUMENTS

| | | | |
|---|---|---|---|
| 4,781,062 A * | 11/1988 | Taylor | 73/152.16 |
| 4,817,061 A | 3/1989 | Alford et al. | 361/75 |
| 4,881,208 A * | 11/1989 | Liu | 367/35 |
| 4,962,490 A * | 10/1990 | Lyle et al. | 367/35 |
| 5,402,392 A * | 3/1995 | Lu et al. | 367/75 |
| 5,678,643 A | 10/1997 | Robbins et al. | 175/45 |
| 5,899,958 A * | 5/1999 | Dowell et al. | 702/6 |
| 6,002,642 A | 12/1999 | Krebs | 367/73 |
| 6,023,443 A | 2/2000 | Dubinsky et al. | 367/76 |
| 6,065,219 A | 5/2000 | Murphey et al. | 33/544 |
| 6,176,344 B1 * | 1/2001 | Lester | 181/104 |
| 6,181,642 B1 | 1/2001 | Coates et al. | 367/25 |
| 6,466,873 B1 * | 10/2002 | Ren et al. | 702/18 |
| 6,718,266 B1 * | 4/2004 | Sinha et al. | 702/11 |
| 2003/0014190 A1 * | 1/2003 | Dubinsky et al. | 702/7 |

FOREIGN PATENT DOCUMENTS

EP 0232561 A2 * 8/1987

OTHER PUBLICATIONS

Tang and Chundru. "Simultaneous inversion of formation shear–wave anisotropy parameters from cross–dipole acoustic –array waveform data." Geophysics, vol. 63, No. 5 (Sep.–Oct. 1999), pp. 1502–1511.*
R. Coates et al.; *Single–well Sonic Imaging: High–Definition Reservoir Cross–sections from Horizontal Wells*, SPE/Petroleum Society of CIM 65457, pp. 1–10, 14 Figures.
Brian E. Hornby; *Imaging of near–borehole structure using full–waveform sonic data*, Geophysics, vol. 54, No. 6 (Jun. 1989), pp. 747–757, 13 Figures.
Xiaoming Tang; *Simultaneous inversion of formation shear–wave anisotropy parameters from cross–dipole acoustic–array waveform data*, Geophysics, vol. 64, No. 5 (Sep.– Oct. 1999), pp. 1502–1511, 9 Figures.
Cengiz Esmersoy, et al.; *Acoustic imaging of reservoir structure from a horizontal well*, The Leading Edge, Jul. 1998, pp. 940–946, 11 Figures. Sonic Imaging: A Tool for High–Resolution Reservoir Description, BH 2.7, pp. 278–281, 5 Figures.

* cited by examiner

*Primary Examiner*—Bernarr E. Gregory
*Assistant Examiner*—Scott A. Hughes
(74) *Attorney, Agent, or Firm*—Madan, Mossman & Sriram, P.C.

(57) ABSTRACT

Directional acoustic measurements made in the borehole are used for imaging a near-borehole geological formation structure and determination of its orientation. Four-component cross-dipole data set measured in a deviated borehole in combination with the directionality of the compressional waves in the dipole data give the orientation of bed boundaries crossing the borehole. The low-frequency content (2~3 kHz) of the data allows for imaging the radial extent of the formation structure up to 15 m, greatly enhancing the penetration depth as compared to that obtained using conventional monopole compressional-wave data. A combination monopole/dipole arrangement of sources and receivers may also be used for imaging of bed boundaries.

29 Claims, 10 Drawing Sheets

IMAGING NEAR-BOREHOLE STRUCTURE USING DIRECTIONAL ACOUSTIC-WAVE MEASUREMENT

BACKGROUND OF THE INVENTION

1. Field of the Invention

This invention relates generally to systems for drilling and logging boreholes for the production of hydrocarbons and more particularly to a drilling system having an acoustic measurement-while-drilling ("MWD") system as part of a bottomhole assembly, or an after-drilling wiereline logging system having an acoustic device for measuring acoustic velocities of subsurface formations during or after drilling of the wellbores and determining the location of formation bed boundaries around the bottomhole assembly, as in the MWD system, or around the wireline logging system. Specifically, this invention relates to the imaging of bed boundaries using directional acoustic sources. For the purposes of this invention, the term "bed boundary" is used to denote a geologic bed boundary, interface between layers having an acoustic impedance contrast, or a subsurface reflection point. For the purposes of this invention, the term acoustic is intended to include, where appropriate, both compressional and shear properties.

2. Description of the Related Art

To obtain hydrocarbons such as oil and gas, boreholes or wellbores are drilled through hydrocarbon-bearing subsurface formations. A large number of the current drilling activity involves drilling "horizontal" boreholes. Advances in the MWD measurements and drill bit steering systems placed in the drill string enable drilling of the horizontal boreholes with enhanced efficiency and greater success. Recently, horizontal boreholes, extending several thousand meters ("extended reach" boreholes), have been drilled to access hydrocarbon reserves at reservoir flanks and to develop satellite fields from existing offshore platforms. Even more recently, attempts have been made to drill boreholes corresponding to three-dimensional borehole profiles. Such borehole profiles often include several builds and turns along the drill path. Such three dimensional borehole profiles allow hydrocarbon recovery from multiple formations and allow optimal placement of wellbores in geologically intricate formations.

Hydrocarbon recovery can be maximized by drilling the horizontal and complex wellbores along optimal locations within the hydrocarbon-producing formations (payzones). Crucial to the success of these wellbores is (1) to establish reliable stratigraphic position control while landing the wellbore into the target formation and (2) to properly navigate the drill bit through the formation during drilling. In order to achieve such wellbore profiles, it is important to determine the true location of the drill bit relative to the formation bed boundaries and boundaries between the various fluids, such as the oil, gas and water. Lack of such information can lead to severe "dogleg" paths along the borehole resulting from hole or drill path corrections to find or to reenter the payzones. Such wellbore profiles usually limit the horizontal reach and the final wellbore length exposed to the reservoir. Optimization of the borehole location within the formation can also have a substantial impact on maximizing production rates and minimizing gas and water coning problems. Steering efficiency and geological positioning are considered in the industry among the greatest limitations of the current drilling systems for drilling horizontal and complex wellbores. Availability of relatively precise three-dimensional subsurface seismic maps, location of the drilling assembly relative to the bed boundaries of the formation around the drilling assembly can greatly enhance the chances of drilling boreholes for maximum recovery. Prior art downhole lack in providing such information during drilling of the boreholes.

Modern directional drilling systems usually employ a drill string having a drill bit at the bottom that is rotated by a drill motor (commonly referred to as the "mud motor"). A plurality of sensors and MWD devices are placed in close proximity to the drill bit to measure certain drilling, borehole and formation evaluation parameters. Such parameters are then utilized to navigate the drill bit along a desired drill path. Typically, sensors for measuring downhole temperature and pressure, azimuth and inclination measuring devices and a formation resistivity measuring device are employed to determine the drill string and borehole-related parameters. The resistivity measurements are used to determine the presence of hydrocarbons against water around and/or a short distance in front of the drill bit. Resistivity measurements are most commonly utilized to navigate or "geosteer" the drill bit. However, the depth of investigation of the resistivity devices usually extends to 2–3 meters. Resistivity measurements do not provide bed boundary information relative to the downhole subassembly. Furthermore, error margin of the depth-measuring devices, usually deployed on the surface, is frequently greater than the depth of investigation of the resistivity devices. Thus, it is desirable to have a downhole system which can relatively accurately map the bed boundaries around the downhole subassembly so that the drill string may be steered to obtain optimal borehole trajectories.

Thus, the relative position uncertainty of the wellbore being drilled and the important near-wellbore bed boundary or contact is defined by the accuracy of the MWD directional survey tools and the formation dip uncertainty. MWD tools are deployed to measure the earth's gravity and magnetic field to determine the inclination and azimuth. Knowledge of the course and position of the wellbore depends entirely on these two angles. Under normal operating conditions, the inclination measurement accuracy is approximately plus or minus 0.2°. Such an error translates into a target location uncertainty of about 3.0 meters per 1000 meters along the borehole. Additionally, dip rate variations of several degrees are common. The optimal placement of the borehole is thus very difficult to obtain based on the currently available MWD measurements, particularly in thin pay zones, dipping formation and complex wellbore designs.

One of the earliest teachings of the use of borehole sonic data for imaging of near-borehole structure is that of Hornby, who showed that the full waveforms recorded by an array of receivers in a modern borehole sonic tool contain secondary arrivals that are reflected from near-borehole structural features. These arrivals were used to form an image of the near-borehole structural features in a manner similar to seismic migration. Images were shown with distances of up to 18 m. from the borehole. More recently, Robbins (U.S. Pat. No. 5,678,643) disclosed use of a logging while drilling (LWD) tool for detecting the existence of and distance to adjacent bed boundaries. A transmitter assembly is used to generate either a short acoustic pulse or a swept frequency signal that is detected by an associated receiver assembly. The received signals are processed to determine the velocity of sound in the earth formation and the position of reflecting boundaries.

U.S. Pat. No. 6,084,826 to Leggett, having the same assignee as the present application and the contents of which are fully incorporated herein by reference, discloses a downhole apparatus comprising a plurality of segmented transmitters and receivers which allows the transmitted acoustic energy to be directionally focused at an angle ranging from essentially 0 degrees to essentially 180 degrees with respect to the axis of the borehole. Downhole computational means and methods are used to process the full acoustic wave forms recorded by a plurality of receivers. The ability to control both the azimuth and the bearing of the transmitted acoustic signals enables the device to produce images in any selected direction.

A problem with the prior art methods is that with the exception of Hornby, examples of images are not presented and it is difficult to estimate the resolution of the images and the distances that can be adequately imaged. Furthermore, Hornby does not address the problem of determining the azimuth of formation boundaries. As shown by the examples herein, using the method of the present invention, a greater depth of penetration can be obtained than that possible using prior art methods. In addition, the azimuthal images can be obtained at any desired azimuth: this is in contrast to Leggett where the sources and/or receivers have to be beam-steered to a preselected azimuth, and if an image at a different azimuth is desired, the acquisition has to be repeated.

SUMMARY OF THE INVENTION

The present invention is a method of determining a parameter of interest of a bed boundary in an earth formation away from a borehole in the formation using a multicomponent acoustic logging tool in the borehole. A plurality of multicomponent acoustic measurements indicative of said parameter of interest are obtained at a plurality of depths and for a plurality of source-receiver spacings on the logging tool. An orientation sensor on the logging tool, preferably a magnetometer, is used for obtaining an orientation measurement indicative of an orientation of the logging tool. The multicomponent measurements are rotated to a fixed coordinate system (such as an earth based system defined with respect to magnetic or geographic north) using the orientation measurement, giving rotated multicomponent measurements. The rotated multicomponent measurements are processed for obtaining the parameter of interest.

In a preferred embodiment of the invention, the parameter of interest includes an azimuth and relative dip of the bed boundary. In a first embodiment of the invention, the multicomponent measurements are made with a cross-dipole tool. In a second embodiment of the invention, the multicomponent measurements are hybrid data, i.e., obtained from either a monopole source into a cross-dipole receiver pair or a cross-dipole source into a monopole receiver.

When measurements are made at a plurality of depths, the processing can give a migrated image of bed boundaries in the earth formation. In a preferred embodiment of the invention, compressional waves produced by a dipole source are used. Prior to migration, certain pre-processing steps may be used, such as high pass filtering, first break determination, f-k filtering, dip median filtering, and, selective gating of the data in time windows.

On the migrated sections, the relative dip may be easily obtained by fitting a line to a linear trend on one of said plurality of migrated image data sections. The azimuth is determined by an inversion of the migrated image data sections, the inversion based at least in part on minimizing a cost function over an image area of interest.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

The present invention is a method, system and apparatus for imaging of bed boundaries in an earth formation. To the extent that the following description is specific to a particular embodiment or a particular use of the invention, this is intended to be illustrative and is not to be construed as limiting the scope of the invention. The embodiment of the invention is described with reference to a measurement-while-drilling configuration. This is not to be construed as a limitation, and the method of the present invention can also be carried out in wireline logging.

Figure 1A:
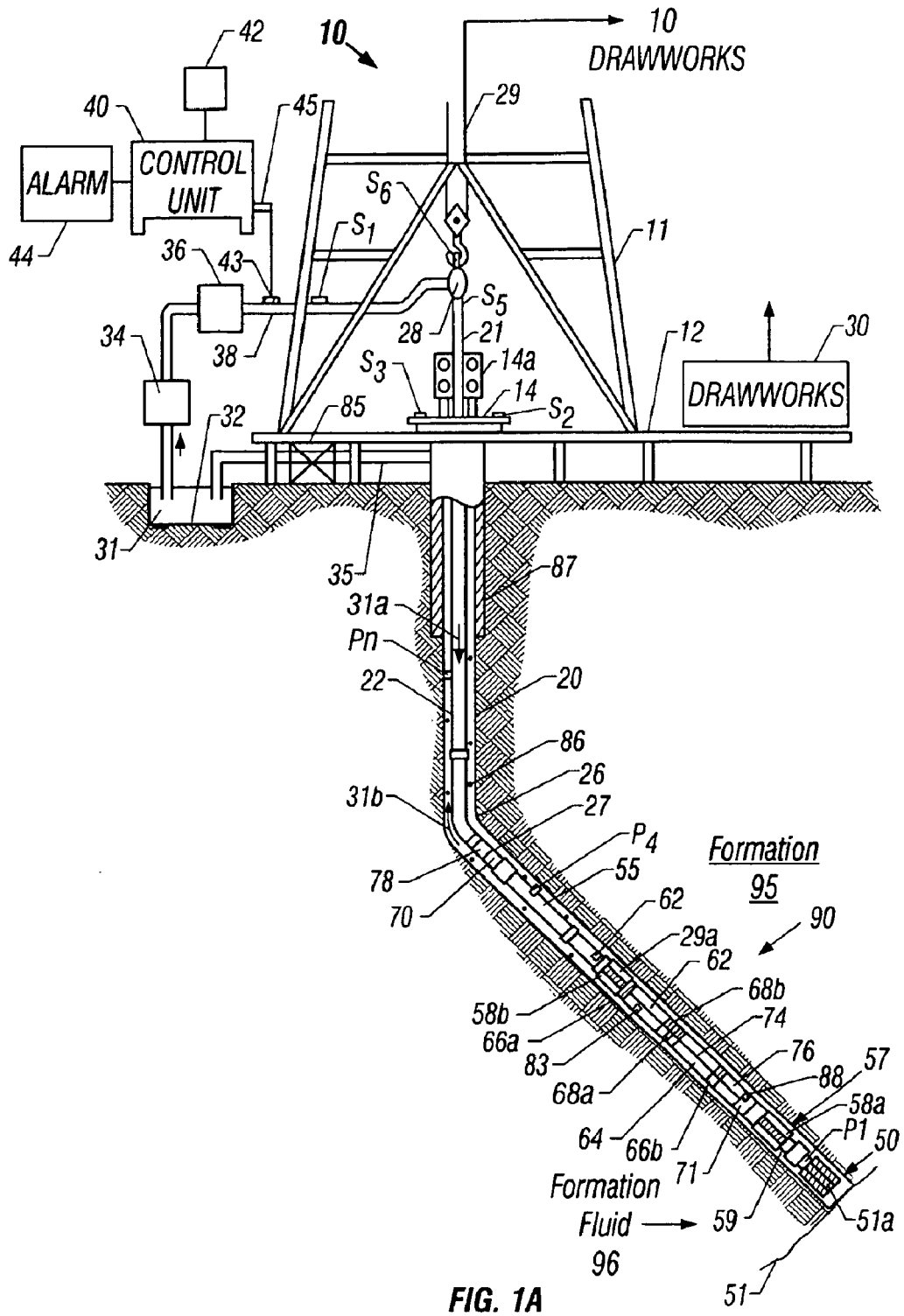
FIG. 1A shows a schematic diagram of a drilling system that employs the apparatus of the current invention in a logging-while-drilling (LWD) embodiment.

FIG. 1A shows a schematic diagram of a drilling system 10 having a bottom hole assembly (BHA) or drilling assembly 90 that includes sensors for downhole wellbore condition and location measurements. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole through the annular space 27 between the drill string 20 and the borehole 26 and returns to the mud pit 32 via a return line 35 and drill-cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications only rotating the drill pipe 22 rotates the drill bit 50. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$–$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1A shows an example resistivity-measuring device 64 in BHA 90. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 are suitably placed along the resistivity-measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity-measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in any detail.

As noted earlier, a significant portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized a rotary table does not rotate the tubing; instead it is injected into the wellbore by a suitable injector 14a while the downhole motor 55 rotates the drill bit 50.

Figure 1B:
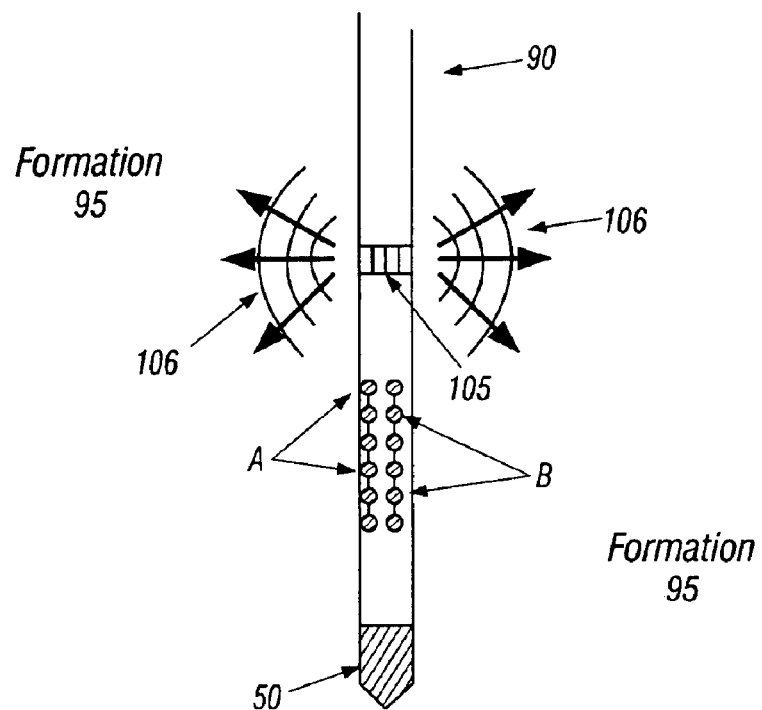
FIG. 1B illustrates a LWD tool on a drill collar.

FIG. 1B is a schematic view of an acoustic logging while drilling tool system on a BHA drill collar 90 containing a drill bit 50. This system is mounted on the BHA drill collar 90 for performing acoustic measurements while the formation is being drilled. The acoustic logging while drilling tool system has a source 105 to emit acoustic vibrations 106 that may traverse formation 95 and may also be propagated along the borehole wall and be received by sensors A and B which may be in arrays. These sensors are discussed later in the application. A point to note is that the sensors are disposed between the transmitter and the receiver. This has important benefits in that the desired signal produced by the transmitter travels in a direction opposite to the direction of noise generated by the drill bit 50. This makes it possible to use suitable filtering techniques, including phased arrays, to greatly reduce the drillbit noise. In an alternate embodiment of the invention, the transmitter 105 may be located between the sensors and the drillbit 50.

Figure 2:
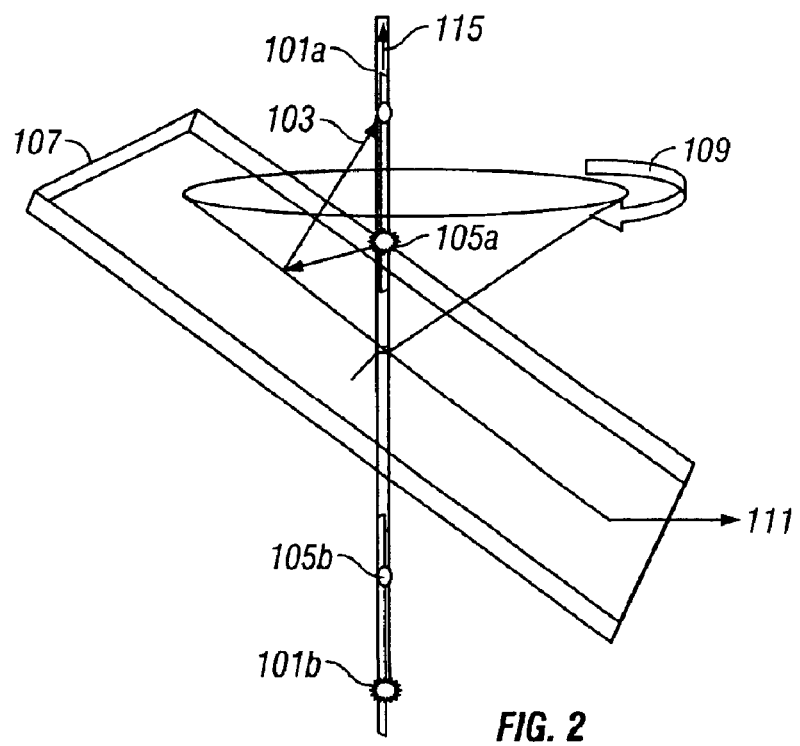
FIG. 2 shows the geometry of a logging tool in a borehole with a dipping bed boundary crossing the borehole.

FIG. 2 illustrates how borehole acoustic measurement can obtain the geological structural information away from the borehole. Depicted is a logging tool having one or more sources 101a, 101b crossing a dipping bed 107 intersecting the borehole 115. As an acoustic source on the tool is energized, it generates acoustic waves that can be classified into two categories according to their propagation direction. The first is the waves that travel directly along the borehole. These direct waves are received by an array of receivers (not shown) on the tool and subsequently used to obtain acoustic parameters, such as velocity, attenuation, and anisotropy, etc., for the formation adjacent to the borehole. The waves of the second category are the acoustic energy that radiates away from the borehole and reflects back to the borehole from boundaries of geological structures. These waves are called secondary arrivals in acoustic logging data because their amplitudes are generally small compared to those of the direct waves. As shown in this figure, depending on whether the tool is below or above the bed, acoustic energy strikes the lower or upper side of the bed and reflects back to the receiver as the secondary arrivals. An exemplary raypath 103 for such a reflected wave is shown. These secondary arrivals can be migrated to image the formation structural feature away from the borehole, in a way similar to the surface seismic processing.

To date, most near-borehole acoustic imaging has been exclusively preformed using measurements made by monopole acoustic tools. Monopole compressional waves with a center frequency around 10 kHz are commonly used for the imaging. The acoustic source of a monopole tool has an omni-direction radiation and the receivers of the tool record wave energy from all directions. Consequently, acoustic imaging using monopole tools is unable to determine the strike azimuth 111 of the near-borehole structure. This uncertainty is depicted as 109 in FIG. 2. This is easily understood from FIG. 2, where the acoustic reflection originates from a line on the bed that intersects the borehole along the bed's strike direction. Without the ability to resolve the azimuth of the acoustic reflection, the reflection line and its strike azimuth cannot be determined because any bed plane tangential with a cone around the borehole axis can contribute to the acoustic image.

The present invention resolves the azimuth ambiguity using directional acoustic measurements in a borehole. These directional measurements can be made with an acoustic tool that has a dipole source and/or receiver system. U.S. Pat. No. 4,649,525 to Angona et al discloses the use of a dipole acoustic logging for determination of formation shear velocities. A very useful property of a dipole source or receiver system is its directionality. That is, the generated or the received wave amplitude A depends on the angle θ between the wave's associated particle motion direction (polarization) and the source or receiver orientation, and may be denoted by $$A \propto \cos\theta \qquad (1).$$

With this directionality, one can use oriented source and/or receiver(s) to generate and record acoustic wave energy. An acoustic measurement made in this way is called the directional measurement. In fact, the directionality property of the dipole source/receiver has been utilized to determine formation azimuthal shear-wave anisotropy. In the present invention, the directionality of the wave amplitudes, as measured by a directional acoustic system, is used to determine the azimuth of a near-borehole structure.

Such directional measurements using dipole transmitters and/or receivers have been disclosed in U.S. Pat. No. 6,176,344 to Lester having the same assignee as the present invention and the contents of which are fully incorporated herein by reference. Differences between the method of the present invention and the teachings of Lester are pointed out below.

An issue that must be addressed in the directional measurement is the rotation of the acoustic measurement tool, which is commonly encountered during logging in a borehole. The tool-rotation effect, if uncorrected, will obscure the directional information of the measurement. This is especially important when the (vector) wavefield measured at various depths (or tool orientations) is migrated to image a formation structure. This problem is solved by developing a conversion relationship that converts the wave components measured in the tool-frame coordinate system into a fixed coordinate system. Consequently, acoustic imaging of a formation structure using the wave-component data for the latter system preserves the directional information and allows for determining the structure's azimuth.

The above described concept has been applied to data acquired with conventional cross-dipole acoustic sources and receivers. A novel aspect of the present invention is the use of the compressional waves (instead of the shear waves) generated by a dipole source to perform the imaging and azimuth determination analyses. It is well known that dipole acoustic logging in soft formations (e.g, unconsolidated sediments) often generates quite significant compressional wave energy. The compressional wave, being generated by the dipole source, has the same directionality as the shear wave and can thus be used to determine the azimuth of a formation structure. Another important benefit is that the dipole-generated compressional wave usually has a much lower frequency content (around 2~3 kHz) compared to that of a monopole compressional wave (around 8~10 kHz). Using the lower-frequency wave allows a deeper depth of penetration and better image of structural features away from borehole.

In a first embodiment of the invention, a dipole is used as both the source and the receiver. In a second embodiment of the invention, a dipole/monopole combination is used wherein the source is one of a dipole and a monopole, and the receiver is the other of a dipole and a monopole. This is in contrast to the invention of Lester wherein either (i) a monopole source is used with a monopole and dipole receiver, or (ii) a monopole and dipole source is used with a monopole receiver.

We start by deriving the theoretical relationship between the reflection amplitude and the azimuth of a formation bed that reflects the acoustic wave back to borehole. This relationship will also serve as the basis for the coordinate conversion of the acoustic measurement and the inversion of the bed azimuth from the measured data.

Figure 3:
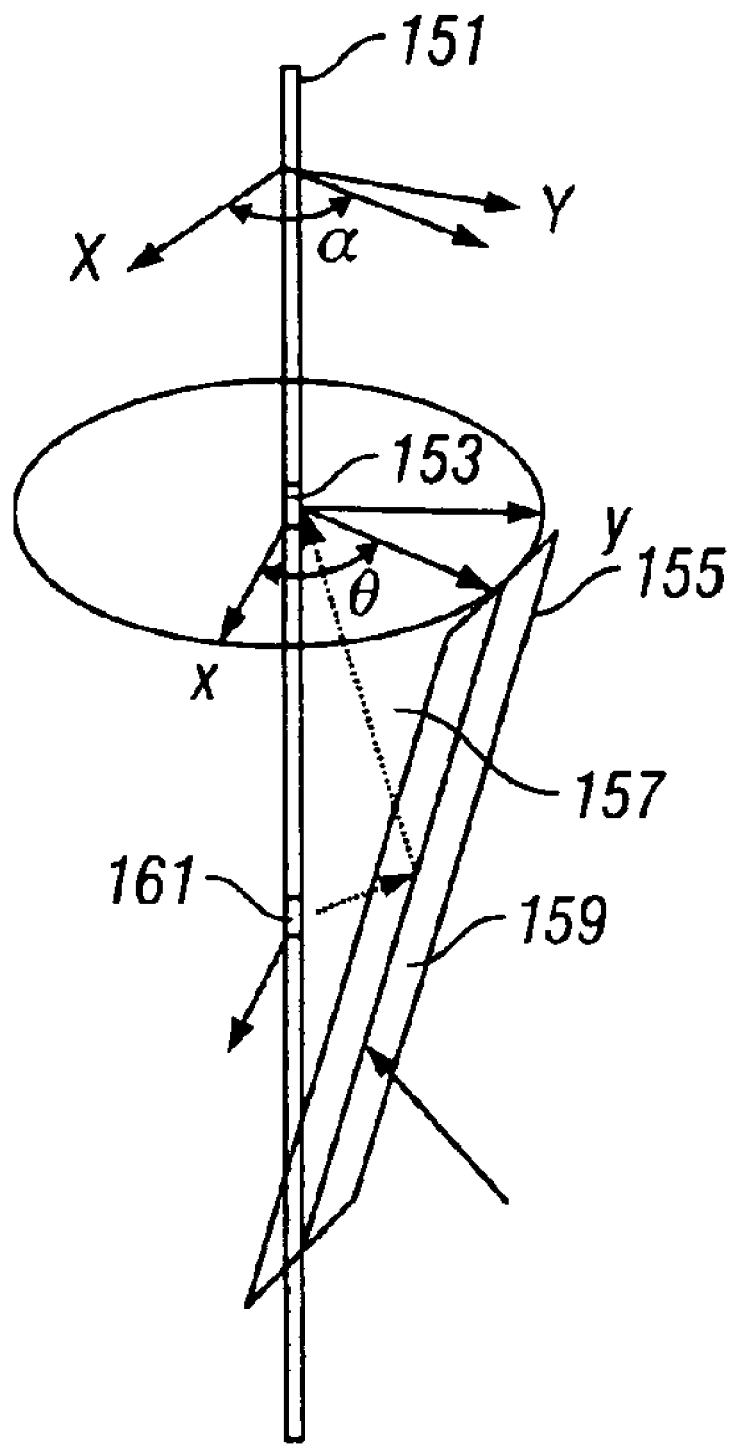
FIG. 3 is an illustration of single-well imaging using directional acoustic measurement.

Turning now to FIG. 3, a borehole 151 is schematically depicted. A fixed rectangular coordinate system X-Y is shown. the Z-axis is parallel to the borehole axis. Typically, the fixed coordinate system would be defined with respect to the cardinal points, say North and West. North for the purpose of this invention may be magnetic north when orientation measurements are made with a magnetometer. If, as is commonly the case, a determination of magnetic declination is made, north may be geographic north. What is important is that the processing of the data be in a fixed coordinate system. The X-axis makes an angle α with the strike direction of the bedding plane. Also shown in FIG. 3 is a tool coordinate system denoted by x-y that makes an angle AZ with respect to the fixed coordinates X-Y. This angle is usually recorded during logging. For a vertical well, AZ is usually the azimuth curve. In a deviated well, the AZ angle should be the tool-face angle measured relative to the high-side of the borehole. Since the high side of the borehole usually points a constant direction over a long distance along the well bore, the high-side direction can be taken as the X- (or Y-) axis direction of the fixed earth coordinates. Obviously, $$\alpha = AZ + \theta \qquad (2)$$

Let us consider the acoustic energy emitted from a directional source in connection with a dipping bed crossing the borehole, as depicted in FIG. 3. For the entire bedding plane 155, only the line 159 that intersects the borehole along the strike direction reflects the acoustic energy back to the borehole (denoted by the raypath 157). This line and the borehole axis form a plane. The source 153 is oriented along the x-axis of the rectangular coordinate system on the tool and makes an angle θ with the plane. If the source intensity is S and the reflection coefficient of the bed plane is R, then, according to the directivity of the (dipole) source eq. (1), the reflected wave amplitude is S R cos θ.

Now consider recording the reflected wave with a dipole system that has two dipole receivers 161 respectively oriented in the x- and y-direction of the rectangular coordinate system. The received wave components, according equation (1), can be mathematically calculated by projecting S R cos θ onto the x- and y-axis:

$$\begin{cases} xx = S \cdot R \cdot \cos^2\theta \\ xy = S \cdot R \cdot \cos\theta\sin\theta \end{cases} \quad (3)$$

where the first letter refers to the source and the second refers to the receiver orientation, respectively. Similarly, for a dipole source along the y-axis, the received x- and y-components are given by $$\begin{cases} yx = S \cdot R \cdot \cos\theta\sin\theta \\ yy = S \cdot R \cdot \sin^2\theta \end{cases} \quad (4)$$

Eqns. (3) and (4) theoretically give the four-component wave data for the tool consisting of two orthogonal dipole source and receiver systems. This tool is commonly known as the cross-dipole acoustic tool, as is widely used in wireline acoustic logging.

Another type of directional acoustic measurement involves using either dipole or monopole as source and receivers. This is referred to as a combined dipole and monopole system. For example, one can use dipole in x- or y-direction as source and monopole as receiver, and vise versa. Because the monopole does not have directionality and only the directionality of the dipole [eqn. (1)] plays a role in this case, it is obvious that the recorded wave components assume the directivity of the dipole (source or receiver), as $$\begin{cases} xm = mx = S \cdot R \cdot \cos\theta \\ ym = my = S \cdot R \cdot \sin\theta \end{cases} \quad (5)$$

where the letter m represents a monopole source or receiver; mx (or my) means emitting a wave with a monopole source and recording the wave using the x- (or y-) direction dipole receiver and xm (or ym) means emitting a wave with an x- (or y-) direction dipole source and recording the wave using a monopole receiver.

Eqns. (3)–(5) indicate that the multi-component data of the directional acoustic measurement contain the information about the azimuth θ. In fact, taking amplitude ratio of the wave components for the respective measurements, one has $$\tan\theta = \frac{|xy|}{|xx|} = \frac{|yy|}{|yx|} = \frac{|ym|}{|xm|} = \frac{|my|}{|mx|} \quad (6)$$

where |xy| denotes taking the amplitude of the xy data. Thus, the acoustic data of any of the component combination, i.e., (xx, xy), or (yx, yy), or (mx, my), or (xm, ym), can be used to calculate the strike azimuth of the formation bedding plane.

Let us now address the issue of tool rotation in the directional acoustic measurement. In the actual acoustic imaging using borehole logging data, the data at multiple depths (or tool positions) are used. In other words, acoustic data measured at consecutive tool positions are migrated and stacked at each point of the imaging area (Hornby). However, if tool rotates significantly over these measurement positions, the directionality information of the measurement will be distorted. This happens because, as the tool rotates, the tool's azimuth θ with respect to a bedding plane varies and the amplitude of the recorded components also changes. As a result, when the data measured at different θ values are migrated and stacked to form an image, the azimuth information contained in the amplitude of the resulting image gets distorted or even lost. Fortunately, in acoustic logging, the tool frame azimuth, AZ, relative to a fixed direction (e.g., the earth's north, as in a vertical borehole, or borehole's high side, as in a deviated well) is usually recorded for each tool position along the borehole using a suitable device such as a magnetometer on the tool. With the measured tool azimuth, one can develop a relationship to convert the wave components in eqns. (3)–(5) into the component data in the fixed coordinates. The subsequent imaging processing using the new component data will preserve the azimuth information in the resulting images.

By using eq. (2) in eqns. (3)–(5), one can calculate the wave components in the fixed coordinates. Notice that wave components in the fixed coordinates are defined in the same way as their counterpart in the tool frame coordinates. For example, the XY component represents a wave emitted from a dipole source in the X-direction and recorded by a dipole receiver in the Y-direction. These components also satisfy equations (2) through (4), noting that the azimuth θ in these equations should now be replaced by α, The relation between the signal components in the tool and the fixed coordinate systems is then given by $$\begin{cases} XX = xx \cdot \cos^2 AZ - (xy + yx) \cdot \cos AZ \cdot \sin AZ + yy \cdot \sin^2 AZ \\ XY = (xx - yy) \cdot \cos AZ \cdot \sin AZ + xy \cdot \cos^2 AZ - yx \cdot \sin^2 AZ \\ YX = (xx - yy) \cdot \cos AZ \cdot \sin AZ + yx \cdot \cos^2 AZ - xy \cdot \sin^2 AZ \\ YY = yy \cdot \cos^2 AZ + (xy + yx) \cdot \cos AZ \cdot \sin AZ + xx \cdot \sin^2 AZ \end{cases} \quad (7)$$

for the dipole source and receiver, and by $$\begin{cases} X = x \cdot \cos AZ - y \cdot \sin AZ \\ Y = y \cdot \cos AZ + x \cdot \sin AZ \end{cases} \quad (8)$$

for the dipole-monopole system. For the combined system, mx=xm and my=ym, so the letter m can be dropped.

Notice in the above coordinate conversion [eqn. (7) or (8)], if there are N bedding planes with different azimuths, the measured component data include the reflections from all these planes. Therefore, the data in eqns (7) and (8) should be regarded as the sum of all reflections. For example, the xx component should be regarded as $$xx \to \sum_{n=1}^{N} xx_n$$

where $xx_n$ is the reflection data arising from the nth (n=1, 2, 3, . . . N) reflector.

The advantage of working in the fixed coordinates is now evident. In the fixed coordinates, the azimuth of a bedding plane, $\alpha$, is fixed. Therefore, the wave component data [XX, XY, YX, and YY in eqn. (7) or X and Y in eqn. (8)] at various tool positions along the borehole maintain the same azimuth with respect to a reflector, regardless of the change of the tool azimuth, AZ, at these positions. These data can then be migrated and stacked to form an image without losing the azimuth information. The resulting acoustic image of various components can be used to determine the azimuth of the bedding plane.

The migration of the acoustic data of each component for imaging a formation structure uses the conventional seismic processing method. One major difference of the borehole acoustic data, as compared to surface seismic data, is the large amplitude direct arrivals in the borehole data. These direct waves must be removed before processing the secondary arrivals of much smaller amplitude.

Figure 4:
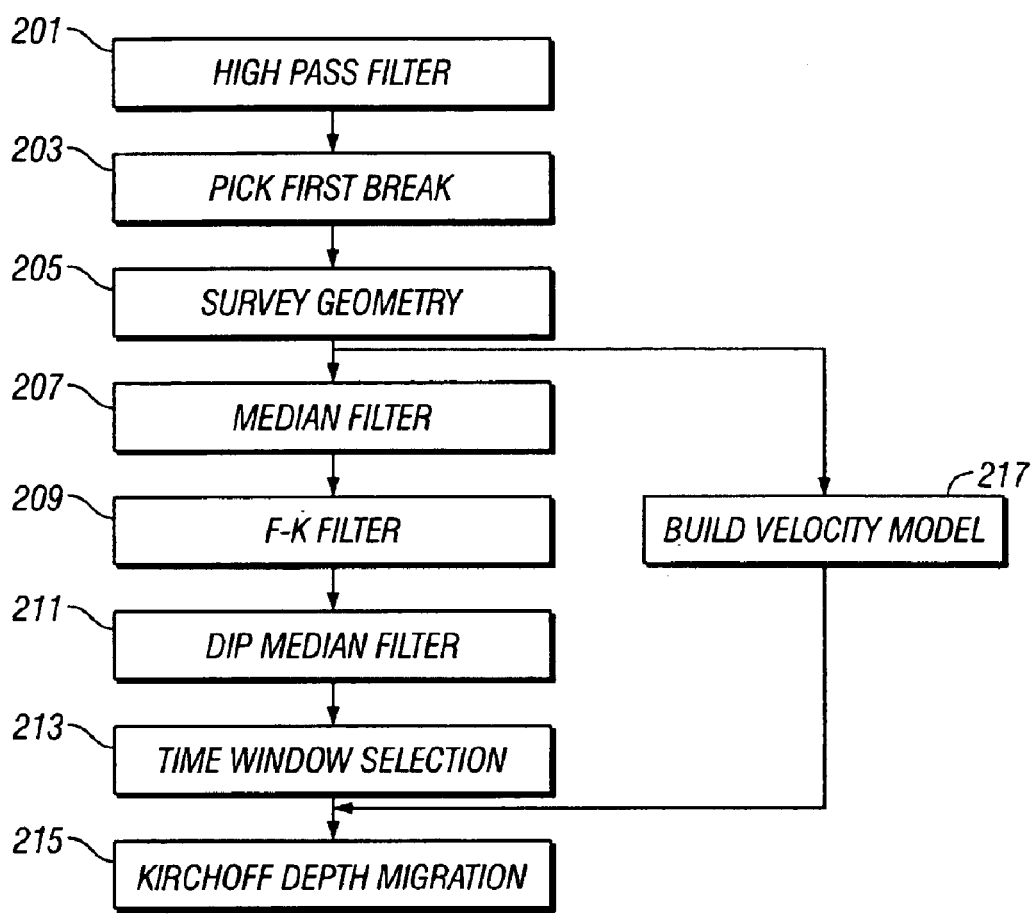
FIG. 4 is an illustration of some of the principal steps used in the present invention for obtaining a migrated image of the earth formation.

The preferred processing sequence used for processing the data is illustrated in FIG. 4. This is the same processing sequence described in Li et al. for processing monopole data. A band-pass filtering (high cut) technique may be used 201 to first remove the low-frequency events, such as the low-frequency Stoneley waves generated by a monopole source, or the low-frequency flexural-shear waves generated by a dipole source. First breaks are picked 203 and after incorporating the survey geometry 205, a median filter is applied to remove the direct waves. Afterwards, wave-separation techniques are applied to separate the secondary arrivals from the direct arrivals based on their moveout characteristics. For example, in the single-receiver data gathered for various depths (or tool positions), the direct arrivals have a small moveout because their propagation distance (source-to-receiver spacing) is fixed. In comparison, the reflection events have a large moveout because their propagation distance changes as the tool moves close to or away from the reflector. A number of techniques can be used for the wave separation, e.g., f-k methods such as that taught by Hornby, or a combination of f-k and median filtering by Li et al, etc. The separated waves, according to their moveout, are sorted into up-dip (reflected up-going, see FIG. 2) and down-dip (reflected down-going) subsets 209. Optionally, a dip median filter may be applied 211 to enhance the downgoing and upcoming reflections.

The data may be windowed to exclude converted waves and multiples. Following this, the secondary arrivals, or the (down-going and up-going) reflection events, from the wave-separation procedure are then respectively migrated 215 to image the upper and lower side of the formation reflector. Several migration techniques can be used, e.g., the back-projection scheme using a generalized Radon transform as discussed by Hornby, or the commonly used Kirchoff depth migration method as discussed, for example by Li et al. The migration procedure needs a velocity model to correctly map the reflection events to the position of a formation reflector. For the acoustic logging data, the P-wave velocity obtained from the acoustic logging measurement is conveniently used to build 217 the velocity model (see, for example, Hornby and Li et al).

After migration, the acoustic component data are mapped into a two-dimensional (2D) domain. One dimension is the radial distance, r, away from the borehole axis; the other is z, the logging depth, or the tool position, along the borehole. The acoustic image from the migration procedure has two important properties that are relevant to the present invention. The first is the applicability of the single-well imaging to the multiple component data containing reflections from multiple reflectors (bedding planes of different azimuths). That is, the migration/imaging procedure can map these reflectors in the 3D space onto the 2D image of each component, the only requirement being that the locations of the reflectors in the r-z domain satisfy the imaging condition. The image amplitude, or intensity, of the reflectors, however, may vary depending on their azimuth. This then relates to the second property: the amplitude preservation property, which states that the amplitude of each component relative to other component(s) remains the same before and after migration. This can be easily understood because migration is a linear mapping from the t-z domain, where t is time, to the r-z domain. This second property allows for determining the bedding plane azimuth using the migration image of the multiple-component acoustic data. For this reason, the relationship between reflection amplitude and azimuth [eqns. (1)–(4)] still holds true for the image data.

Figure 5:
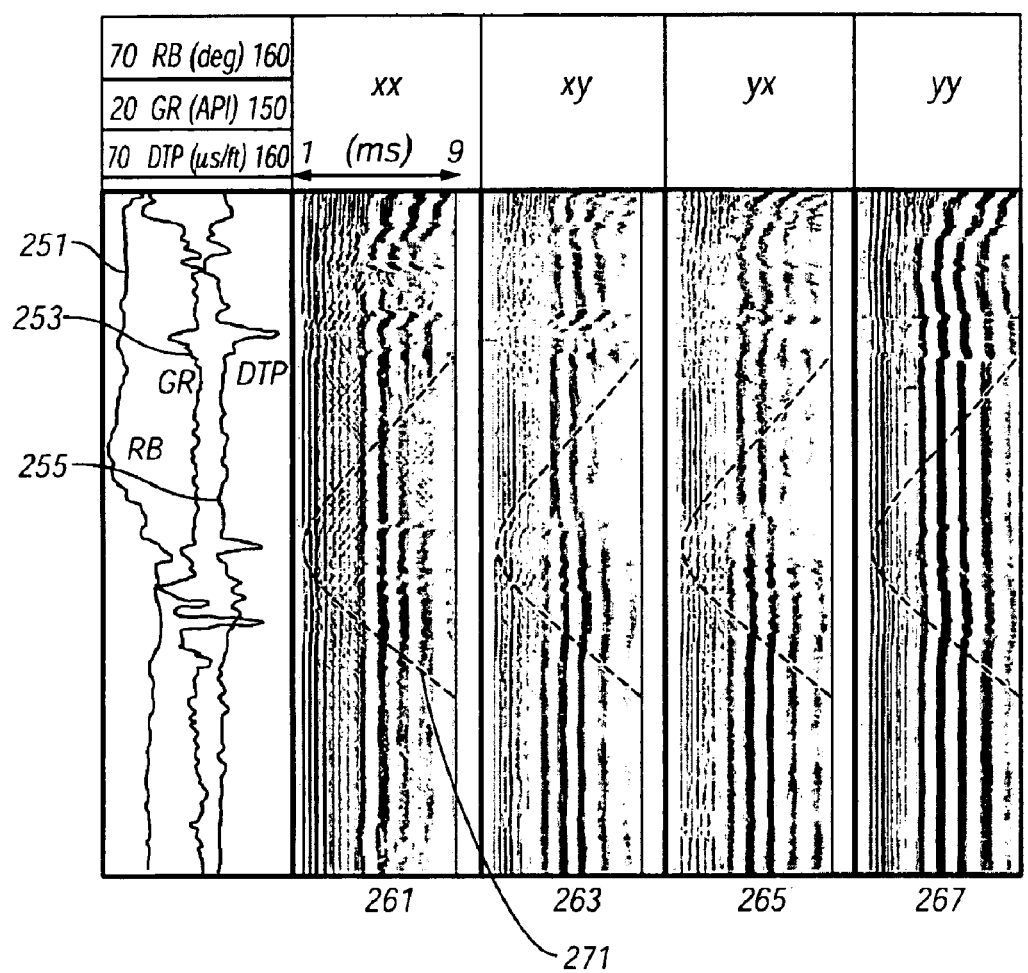
FIG. 5 shows an example of four-component cross-dipole data logged in a deviated well with a slow formation.

FIG. 5 shows an example of data as recorded in the tool coordinate system in a deviated well. The left track shows the recorded tool-face angle relative to the high side of the borehole 251. This angle is also called relative bearing (RB). Also shown in left track are the gamma ray (GR) 253 and the compressional wave slowness (DTP) 255. The data for this example are wireline data, hence the recorded tool-face angle is fairly consistent from depth to depth, but does show some tool rotation about midway in the section. Tracks 2–5 show the xx, xy, yx and yy data. The reflection image is fairly weak in the display, the most dominant signals being direct arrivals. The four-component dipole data were acquired to determine the shear azimuthal anisotropy from the low-frequency flexural-shear waves in the data. The data also show a significant compressional-wave arrival ahead of the shear waves, which is typical for dipole data in slow formations. Because the (deviated) borehole crosses the formation bed boundaries at an angle, these boundaries reflect acoustic waves back to the borehole. As shown in this figure, the reflections for the compressional waves can be clearly traced 271 across the depth (see the reflection moveout curve tracking one particular reflection event), especially in the xx data. The fact the same reflection events show much higher amplitude in the xx data than they show in the yy data is a direct manifestation of the directionality effect of the dipole measurement.

Figure 6:
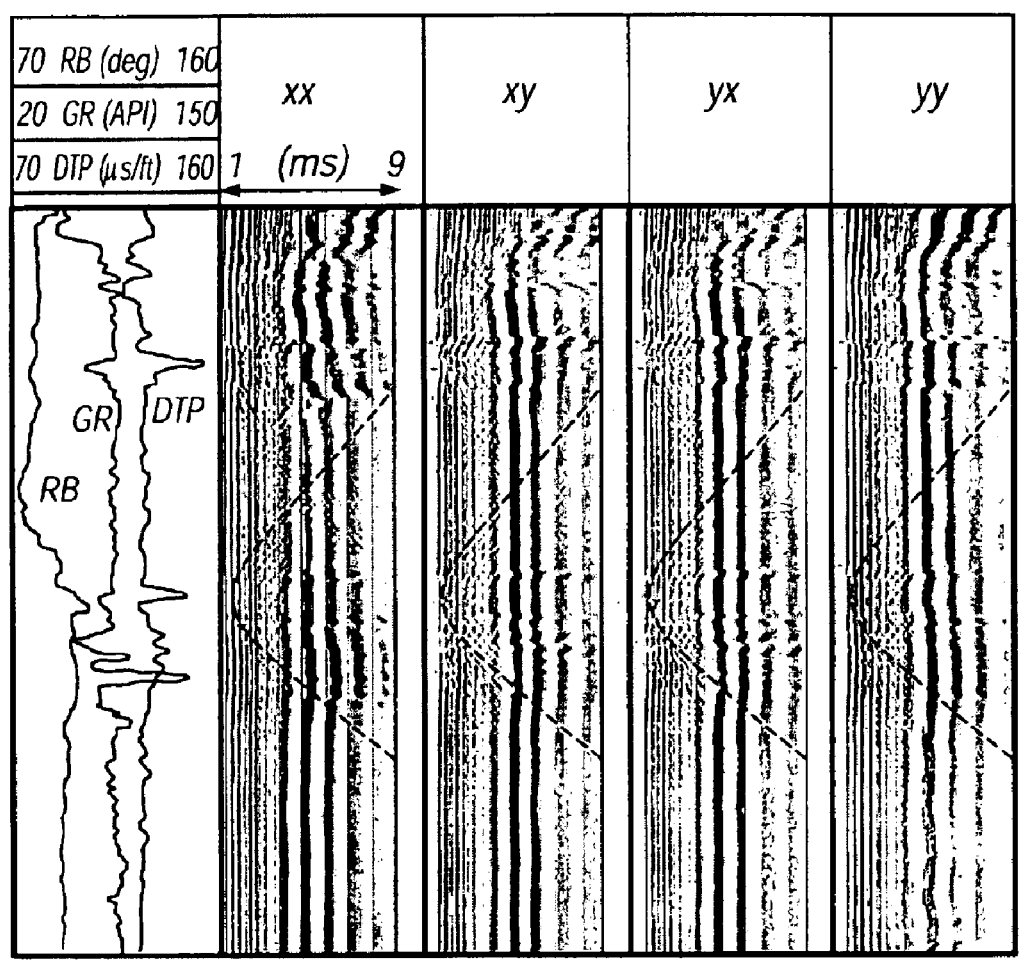
FIG. 6 shows the data of FIG. 5 in a fixed coordinate system.
Figure 7:
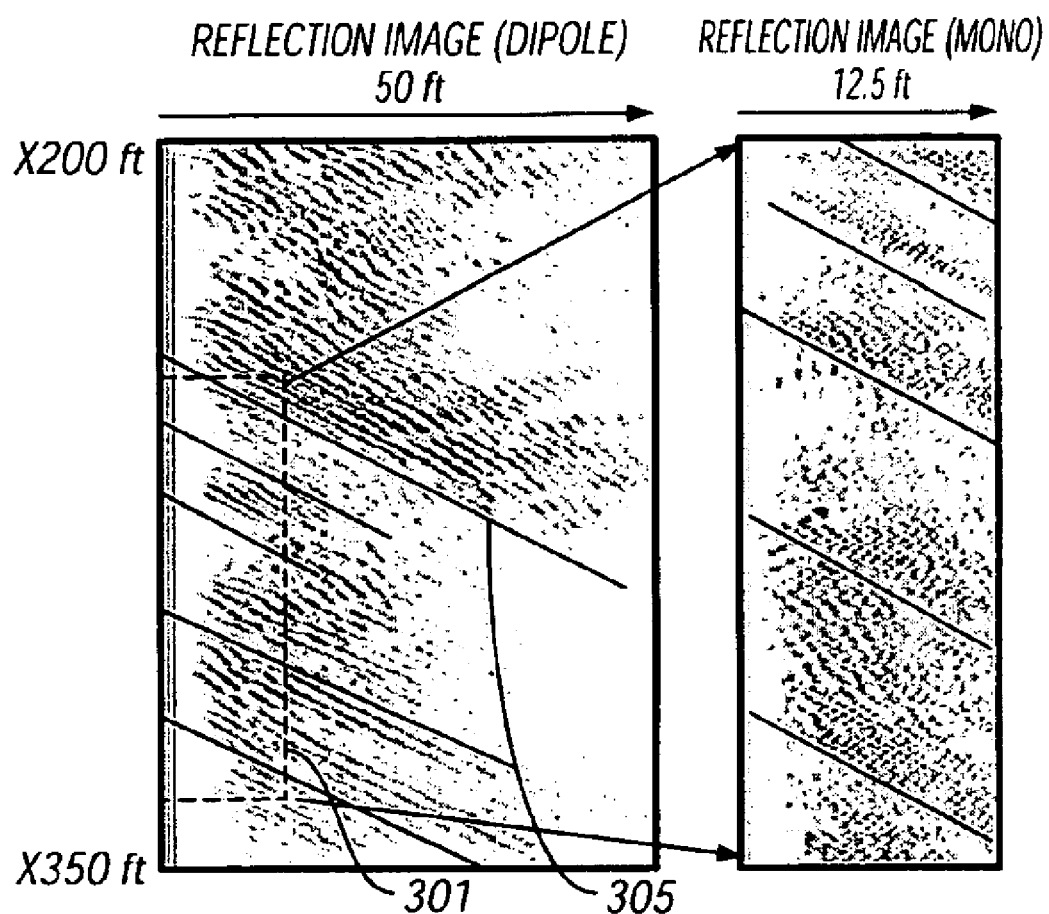
FIG. 7 shows a comparison of imaging results using dipole-generated compressional-wave data (left panel) and the conventional monopole compressional-wave data.

FIG. 6 shows the data of FIG. 5 rotated to a fixed X-Y coordinate system, where the Y-axis of the system, when projected to the horizontal plane, points to north. The AZ angle, as used in eqn (7) for the rotation, is the tool-face angle (RB)) 251 plus an addtional angle between the borehole high side and the Y-axis. Shown in FIG. 7 are two migrated images. The image on the left is for one component of the dipole data. The image on the right is a migrated image of conventional monopole data. The left image has a maximum radial distance of 50 ft while the right image has a maximum distance of 12.5 ft. The entire right image corresponds to the box shown by 301 in the left image. An exemplary reflection is indicated by the line 305 and is relatively consistent between the different components.

FIG. 7 shows a comparison of the acoustic (down-dip) image from the dipole data (XX-component) and that from the conventional monopole compressional-wave data. The center frequency of the monopole data is about 8–10 kHz.

(The raw monopole waveform data are not shown for brevity reasons). It can be seen that the trends of bed boundaries crossing the borehole have about the same angle on both the dipole and monopole images. In fact, fitting a line such as 305 through the trend (peak or trough) on both images gives almost the same angle of 40° relative to the borehole axis. This angle, compared with the complementary angle of the well's deviation (about 47°) angle from the vertical, gives a dip angle of about 7°. This result shows that the beds are slightly elevated from horizontal. This example shows that near-borehole imaging can determine the dip of formation structures away from the borehole.

Let us now examine the ability of low-frequency dipole-compressional data to image formation structure away from the borehole. Compared to the monopole result, the dipole result shows a clearer and better image of bed boundaries, the radial extent stretching up to 50 ft (~15 m) in the formation. The bed boundaries on the monopole image appear to have a higher resolution because of the higher-frequency wave data, but have a limited radial extension of approximately 12 ft (~4 m) in this case. This significantly enhanced depth of penetration for the dipole data is obviously due to its low-frequency or long-wavelength nature. The wavelength of the dipole-compressional wave (~2–3 kHz) is about 3~4 times that of the monopole compressional wave (~8–10 kHz). Correspondingly, the radial extent of the dipole image is approximately 3~4 times that of the monopole image.

Figure 8:
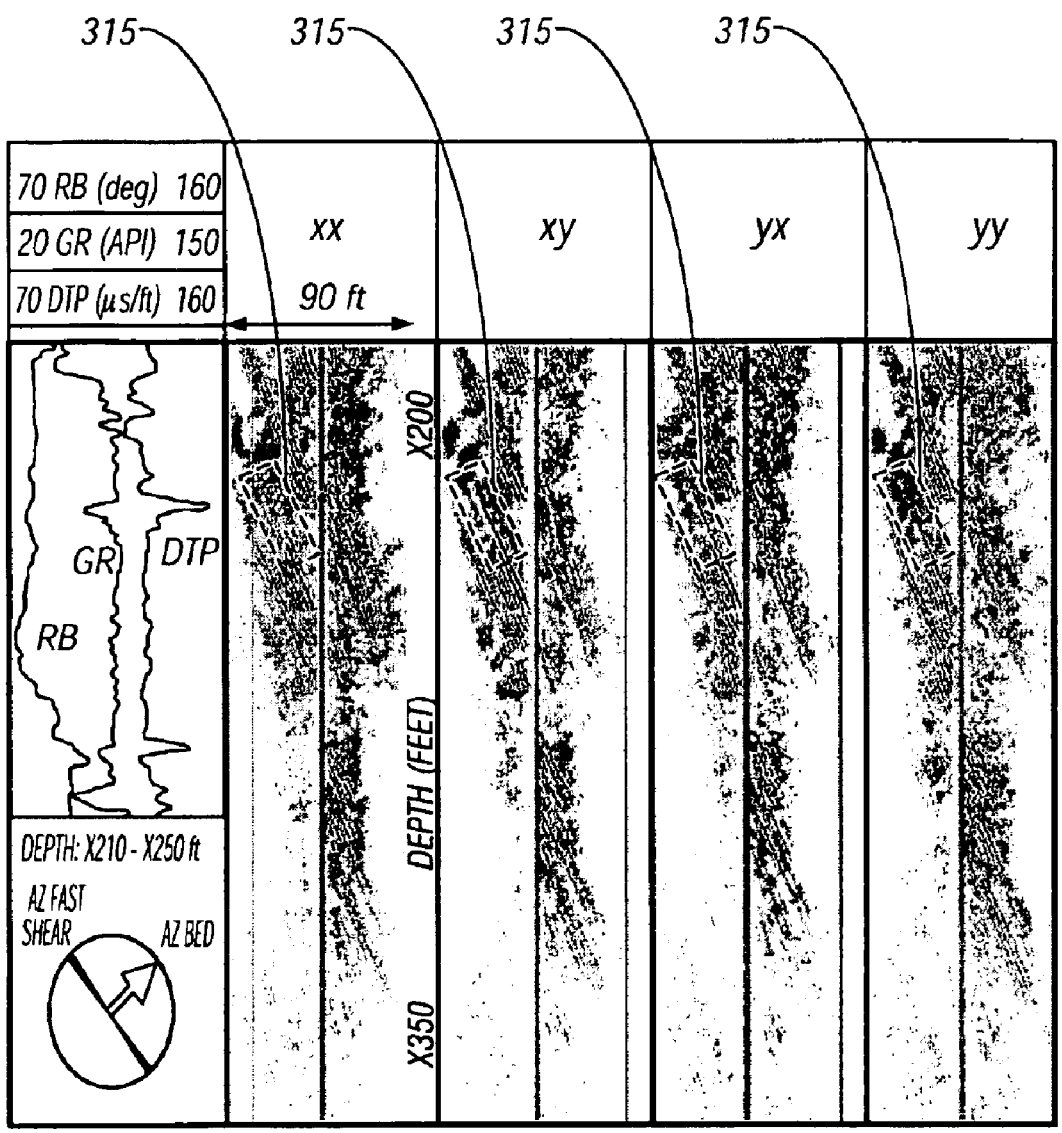
FIG. 8 shows an image of the four-component data of FIG. 5.

The acoustic images of all four components in the fixed coordinates (XX, XY, YX, and YY) are displayed in FIG. 8. For each component, the up-dip image is projected into the left column, and the down-dip image is projected into the right column, of the borehole. A portion of the up-dip image from X250-X220 ft, of all components, is windowed, as shown by the dashed rectangle 315 in FIG. 8, to give the integration area, O(r, z), of eqns. (9) and (10) discussed below.

We next discuss how the migration processed, multiple-component acoustic image data can be used to determine both the azimuth and dip of a bedding plane. The dip determination is relatively straightforward. By fitting a line to the linear trend on the image (any component) of a bedding plane, the angle that the bedding plane makes with the borehole axis is calculated as the arctangent of the slope of the fitted line. This angle, together with the well deviation, gives the dip angle of the bedding plane. The determination of the azimuth, however, requires combining the multiple component image data.

Although the azimuth can theoretically be calculated as the amplitude ratios of the component data, as given in eqn. (5), the amplitude of a component image is not easy to define. For example, which part of the image should be used for the measurement of the amplitude and how the amplitude is measured from the data? The present invention uses an inversion method to estimate the azimuth from the multiple-component image data.

For convenience in the following discussions, the azimuth, $\theta$, of a bedding plane, as appears in eqns. (1)–(5), refers to its azimuth measured in the fixed coordinates X-Y. The component data, such as XX, XY, etc., refer to their migration image in the r-z domain, because these data maintain the same amplitude information as their t-z domain counterparts, as follows from the amplitude preservation property discussed before.

The forward model for the inversion method follows from eqn. (3) or (4), which states that the XX data, multiplied by $\cos\theta$, equals the XY data multiplied by $\sin\theta$. Similarly, the YX data multiplied by $\sin\theta$ equals the YY data multiplied by $\cos\theta$. Based on the equality property, an inversion method is formulated to find the azimuth $\theta$ by minimizing the following cost function calculated as the integrated squared misfit error over the image area of interest. For the XY, XX, YX, and YY data, one has $$E(\theta) = \int\int_{O(r,z)} (XY \cdot \sin\theta - XX \cdot \cos\theta)^2 \, drdz + \qquad (9)$$

$$\int\int_{O(r,z)} (YX \cdot \sin\theta - YY \cdot \cos\theta)^2 \, drdz$$

where the domain of integration O(r, z) in the above integrals is the area occupied by the image of a formation structure (for all components). An example of the domain of integration O(r, z) is discussed below with reference to FIG. 8.

Although the first term (the combination of XX and XY data) and second term (the combination of YX and YY data) can independently yield $\theta$, the use of all four components XX, XY, YX, and YY increases the data redundancy and therefore reduces the noise effect and enhances robustness of the estimation. Similarly, for the X and Y data [see eqn. (7)] of a combined dipole and monopole system, the cost function for the inversion is $$E(\theta) = \int\int_{O(r,z)} (X \cdot \sin\theta - Y \cdot \cos\theta)^2 \, drdz \qquad (10)$$

Without having to perform the minimization of the above cost functions, the solution for $\theta$ can be analytically found. The minimum of eqns (8) or (9) is attained when $$\frac{dE(\theta)}{d\theta} = 0 \qquad (11)$$

Applying the above condition to equation (8) yields an equation to directly calculate $\theta$ from the four component data.

$$\tan 2\theta = \frac{2 \cdot (\langle XX \bullet XY \rangle + \langle YY \bullet YX \rangle)}{\langle XX \bullet XX \rangle - \langle XY \bullet XY \rangle + \langle YX \bullet YX \rangle - \langle YY \bullet YY \rangle} \qquad (12)$$

Similarly, for the two-component data from the combined dipole and monopole system, one has $$\tan 2\theta = \frac{2 \cdot \langle X \bullet Y \rangle}{\langle X \bullet X \rangle - \langle Y \bullet Y \rangle} \qquad (13)$$

In the above two equations, the dot product of the image data of two components a and b, where a and b can be any one of the components, is calculated as $$\langle a \bullet b \rangle = \int\int_{O(r,z)} a(r,z) \cdot b(r,z) \, drdz \qquad (14)$$

There are four solutions for eqn. (13) or (14) in the 0–360° azimuth. Two belong to the two maxima of eqn. (9) or (10) and should be excluded. The other two correspond to the two minima that are separated by $\pi$ (in radians), or 180° (in degrees). This 180° ambiguity is inherent for the dipole source and receiver system. As can be seen from eqns. (3) and (4), using both θ and θ+π results in the same component data and thus the two angles cannot be distinguished. In practice, this ambiguity may be resolved with other information such as dip log or borehole image log, or knowledge of the geology in connection to the borehole trajectory, etc. For example, if the well is drilled, based on the geological observation, along the down-dip direction of the bedding planes, then the θ+π solution can be excluded.

For using acoustic data alone, there is a way to resolve the 180° ambiguity using the combined dipole and monopole system in connection with the single-well image data of a monopole system. For the wave data obtained with the combined dipole-monopole system, replacing θ with θ+π in eqn. (5) changes the sign of the data. Based on this property, a comparison method can be used to resolve the 180° ambiguity by comparing the polarity of the acoustic image obtained for the two systems.

Assume that the combined dipole-monopole system and the monopole system emit acoustic signals with the same polarity (simultaneously positive or negative). For the same formation structure, one compares its compressional-wave image from the monopole data with that from the Xm and Ym (or, mX and mY) of the combined system. If both sets of images have the same polarity for a bedding plane image, then the azimuth is θ. If the polarities have different signs, then the correct azimuth should be θ+π, instead of θ. This is equivalent to the approach discussed in Lester.

Based on the above discussions, one can summarize the processing procedures for determining the bedding plane orientation using directional acoustic logging data. Two cases are discussed.

Figure 9:
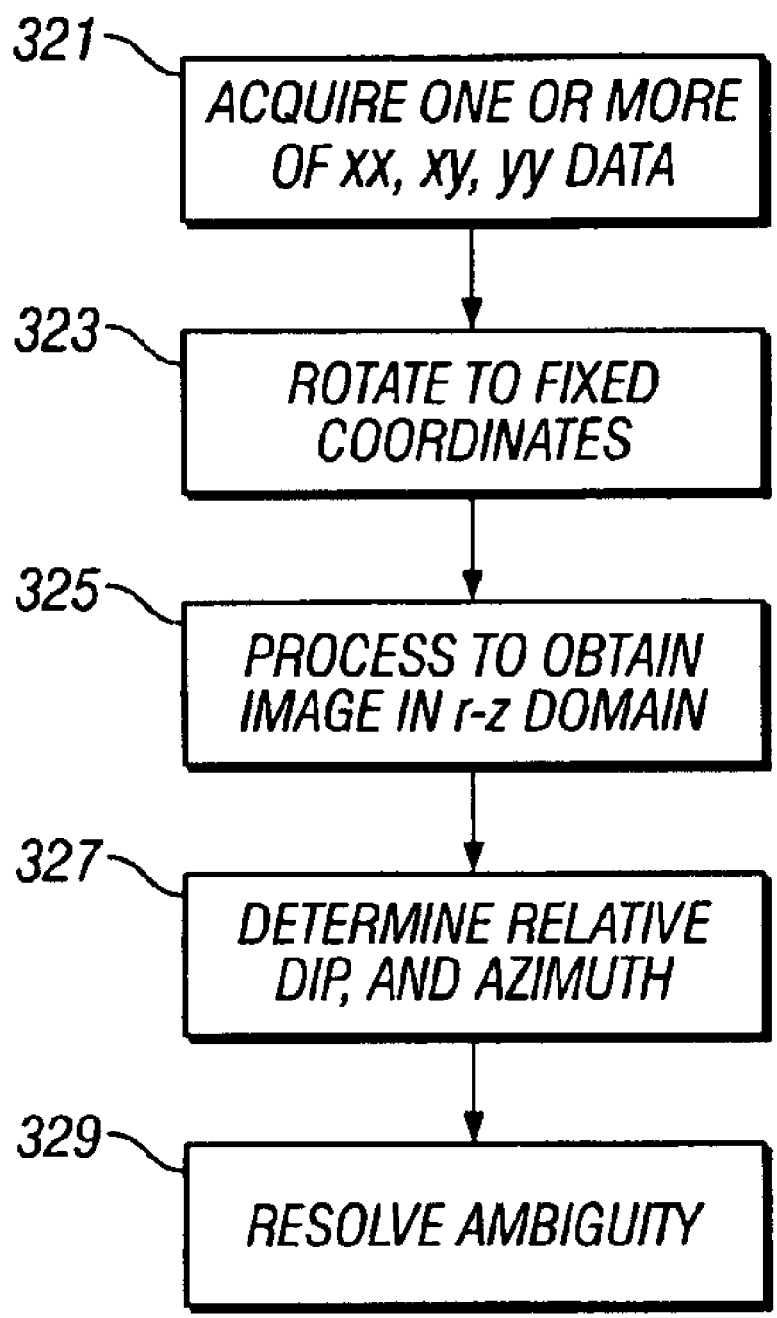
FIG. 9 illustrates steps used for determination of relative dip and azimuth of bed boundaries in the earth formation using four component data.

The first case is for multicomponent data only. The methodology is illustrated in FIG. 9. First, multicomponent data are acquired 321 with an acoustic logging tool in a borehole and the azimuth AZ of the tool relative to, say, earth's north, or any fixed direction, is recorded. The multicomponent data include (xx and xy), or, (yx and yy), or four components. The data are rotated 323 to fixed coordinates using eqn. (7). The data are processed as described with reference to FIG. 4 above to obtain a plurality of migrated images 325 in the r-z domain. Examples of these migrated images are shown in FIG. 8

From the image data, a straight line is fit through the linear trend for the image of a bedding plane to determine 327 its dip angle relative to the borehole axis. Using eqn. (11), the azimuth of the bedding plane is determined. Finally, the obtained azimuth is combined with other information, such as knowledge of the geology relative to the borehole trajectory, dip log or borehole image log, etc., to resolve the 180° ambiguity.

Figure 10:
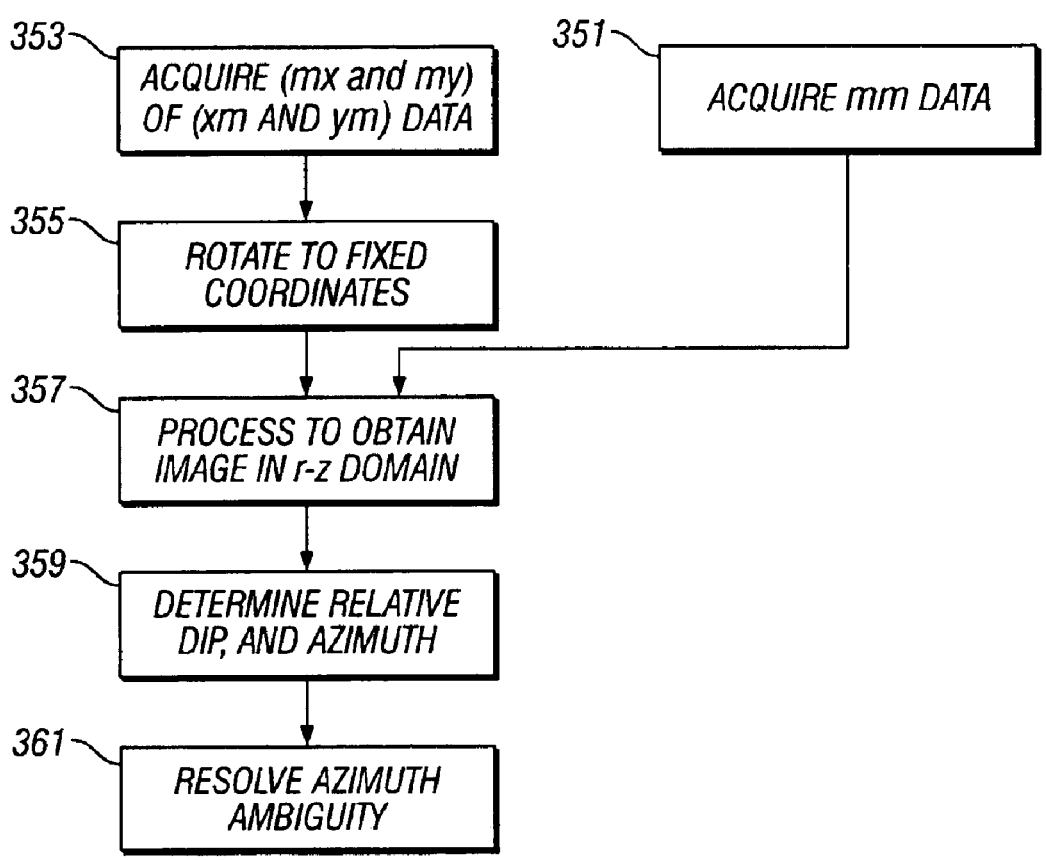
FIG. 10 illustrates steps used for determination of relative dip and azimuth of bed boundaries in the earth formation using composite monopole-dipole data.

The second case is for a combination of monopole and dipole data. The methodology is illustrated in FIG. 10. First, combination (i.e., mix and my, or xm and ym) data are acquired 353 along with conventional monopole data 351. Also acquired are directional information data about the azimuth AZ of the tool relative to, say, earth's north. The data are rotated 355 to fixed coordinates using eqn. (8). The processing scheme described above with reference to FIG. 4 is used to obtain 357 migrated images in the r-z domain. This is done for the data from 351 and 353. From the image data, the relative dip and azimuth are obtained. The relative dip is obtained as a straight line fit through the linear trend for the image of a bedding plane. The relative azimuth is obtained using eqn. (14). The 180° ambiguity is resolved using a comparison of the polarity of the X- or Y-component image with that of the image from the monopole system.

Returning now to FIG. 8, the component data in the windowed area are then used in eqn. (13) to compute the bed azimuth from the component images using the method discussed below. This yields an azimuth of 50°. (In fact, using nearby events, e.g., the event immediately above the windowed one and the event's counterpart in the down-dip image, yields almost the same azimuth, showing the robustness of the estimation.) The validity of the bed azimuth can be independently verified by the shear-wave azimuthal anisotropy estimation result.

The anisotropy can be obtained from the four-component (low-frequency) flexural-shear data in FIG. 5 using a prior art method such as the waveform inversion technique (Tang and Chunduru, 1999). The formation is a shale with strong anisotropy between the direction along, and the direction normal to, the bedding plane. This anisotropy, called transverse isotropy, when measured by a cross-dipole tool along a borehole inclined with to bedding, exhibits an apparent azimuthal anisotropy characteristic: the splitting of fast- and slow-shear waves. The fast-shear wave (commonly known as quasi-SH wave) along the borehole has a polarization parallel to the bedding plane and perpendicular to the borehole axis. The fast-shear polarization is therefore perpendicular to the strike direction (or azimuth) of the bedding plane, because the bed strike and borehole axis lie in the same plane (see FIG. 2). Indeed, as shown by the rose diagram in the bottom of the left panel of FIG. 8, the bedding azimuth from the imaging measurement (~N50°E) and the fast shear polarization direction from the cross-dipole anisotropy measurement (~E50°S/N40°W), are orthogonal to each other. This confirms the validity of the bedding azimuth determination. It is also known that the well trajectory in the subject depth zone is along N54°E, very close to the estimated bed's dipping azimuth N50°E. The determined azimuth is therefore N50°E, instead of S50°W.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of determining a parameter of interest of interest of a bet boundary of an earth formation, the method comprising:

(a) generating acoustic waves in the earth formation using a plurality of transmitters on a multicomponent logging tool in a borehole in said formation and obtaining a plurality of multicomponent acoustic measurements of acoustic waves reflected from the bed boundary for each of the plurality of transmitters, the multicomponent measurements indicative of said parameter of interest;

(b) using an orientation sensor on the logging tool for obtaining an orientation measurement indicative of an orientation of the logging tool;

(c) rotating said plurality of multicomponent measurements to a fixed coordinate system using said orientation measurement, giving rotated multicomponent measurements;

(d) processing said rotated multicomponent measurements and obtaining therefrom said parameter of interest of the bed boundary.

2. The method of claim 1 wherein said parameter of interest comprises one of (i) an azimuth of a bed boundary, and, (ii) a dip of a bed boundary relative to an axis of the borehole.

3. The method of claim 1 wherein said multicomponent measurements comprise at least one of (i) a measurement made with a cross-dipole tool, (ii) a measurement made with a monopole source into a dipole receiver, and, (iii) a measurement made with a dipole source into a monopole receiver.

4. The method of claim 1 wherein said orientation sensor comprises a magnetometer.

5. The method of claim 1 wherein said fixed coordinate system includes an axis aligned with one of (i) magnetic north, (ii) geographic north, and (iii) high side of a deviated borehole.

6. The method of claim 1 further comprising making said multicomponent measurements at a plurality of depths in the borehole.

7. The method of claim 1 wherein said multicomponent measurements comprise signals obtained from reflection from said bed boundary of a compressional wave produced by a dipole source on said logging tool.

8. The method of claim 1 wherein said processing further comprises at least one of (i) applying a high pass filtering, (ii) determining a first break, (iii) using survey information indicative of a position of a source and a receiver on said logging tool, (iv) applying an f-k filtering operation, (v) applying a dip median filter, and, (vi) selecting a time window.

9. The method of claim 1 wherein said multicomponent measurements comprise measurements made with a plurality of distances between a source and a receiver on said logging tool.

10. The method of claim 9 wherein said processing further comprises performing a migration and producing a plurality of migrated image data sections.

11. The method of claim 10 wherein said processing further comprises fitting a line to a linear trend on one of said plurality of migrated image data sections and determining a relative dip angle.

12. The method of claim 9 wherein said processing further comprises inverting said plurality of migrated image data sections and obtaining an azimuth angle, said inversion based at least in part on minimizing a cost function over an image area of interest.

13. The method of claim 1 wherein said parameter of interest comprises an azimuth of the bed boundary, the method further comprising determining a ratio of two of said multicomponent measurements.

14. The method of claim 12 wherein said multicomponent measurements comprise measurements made with a cross-dipole tool, the method further comprising using other data for resolving an ambiguity in said obtained azimuth angle.

15. The method of claim 12 wherein said multicomponent measurements comprise at least one of (i) a measurement made with a monopole source into a dipole receiver, and, (ii) a measurement made with a dipole source into a monopole receiver; the method further comprising using monopole data for resolving an ambiguity in said obtained angle.

16. An apparatus for use in a borehole in an earth formation, the apparatus comprising:
(a) a downhole assembly conveyed in a borehole in said earth formation;
(b) a multicomponent logging tool on said downhole assembly, the multicomponent logging tool including:
(i) a multicomponent transmitter which generates acoustic waves in the formation, and
(ii) a multicomponent receiver which obtains a plurality of multicomponent acoustic measurements of the acoustic waves reflected from a bed boundary indicative of a property of the boundary in said earth formation;
(c) an orientation sensor on the downhole assembly which obtains an orientation measurement indicative of an orientation of the downhole assembly; and
(d) a processor which
(A) rotates said plurality of multicomponent measurements to a fixed coordinate system using said orientation measurement, giving rotated multicomponent measurements, and
(B) processes said rotated multicomponent measurements and estimates therefrom said property of said bed boundary.

17. The apparatus of claim 16 wherein said property of said bed boundary comprises (i) an azimuth of said bed boundary, and, (ii) a dip of said bed boundary relative to an axis of the borehole.

18. The apparatus of claim 16 wherein said multicomponent measurements comprise at least one of (i) a measurement made with a cross-dipole tool, (ii) a measurement made with a monopole source into a dipole receiver, and, (iii) a measurement made with a dipole source into a monopole receiver.

19. The apparatus of claim 16 wherein said orientation sensor comprises a magnetometer.

20. The apparatus of claim 16 wherein said fixed coordinate system includes an axis aligned with one of (i) magnetic north, (ii) geographic north, and (iii) high side of a deviated borehole.

21. The apparatus of claim 16 further wherein said multicomponent logging tool is adapted for making said multicomponent measurements at a plurality of depths in the borehole.

22. The apparatus of claim 16 wherein said multicomponent measurements comprise signals obtained from reflection from said bed boundary of a compressional wave produced by a dipole source on said logging tool.

23. The apparatus of claim 16 wherein said processor further performs at least one of (i) applying a high pass filtering, (ii) determining a first break, (iii) using survey information indicative of a position of a source and a receiver oil said logging tool, (iv) applying an f-k filtering operation, (v) applying a dip median filter, and, (vi) selecting a time window.

24. The apparatus of claim 16 wherein said multicomponent measurements comprise measurements made with a plurality of distances between a source and a receiver on said logging tool.

25. The apparatus of claim 24 wherein said processor further performs a migration and producing a plurality of migrated image data sections.

26. The apparatus of claim 24 wherein said proceasor further inverts said plurality of migrated image data sections and obtains an azimuth angle, said inversion based at least in part on minimizing a cost function over an image area of interest.

27. The apparatus of claim 16 wherein said property of said bed boundary comprises an azimuth of the bed boundary, the method further comprising determining a ratio of two of said multicomponent measurements.

28. The apparatus of claim 26 wherein said multicomponent measurements comprise measurements made with a cross-dipole tool, and wherein the processor further uses other data for resolving an ambiguity in said obtained azimuth angle.

29. The apparatus of claim 26 wherein said multicomponent measurements comprise at least one of (i) a measurement made with a monopole source into a dipole receiver, and, (ii) a measurement made with a dipole source into a monopole receiver; and wherein the processor further uses monopole data for remolving an ambiguity in said obtained angle.

* * * * *